G. L. ADAMS.
TROLLEY HARP MOUNTING.
APPLICATION FILED NOV. 21, 1908.
928,016.
Patented July 13, 1909.
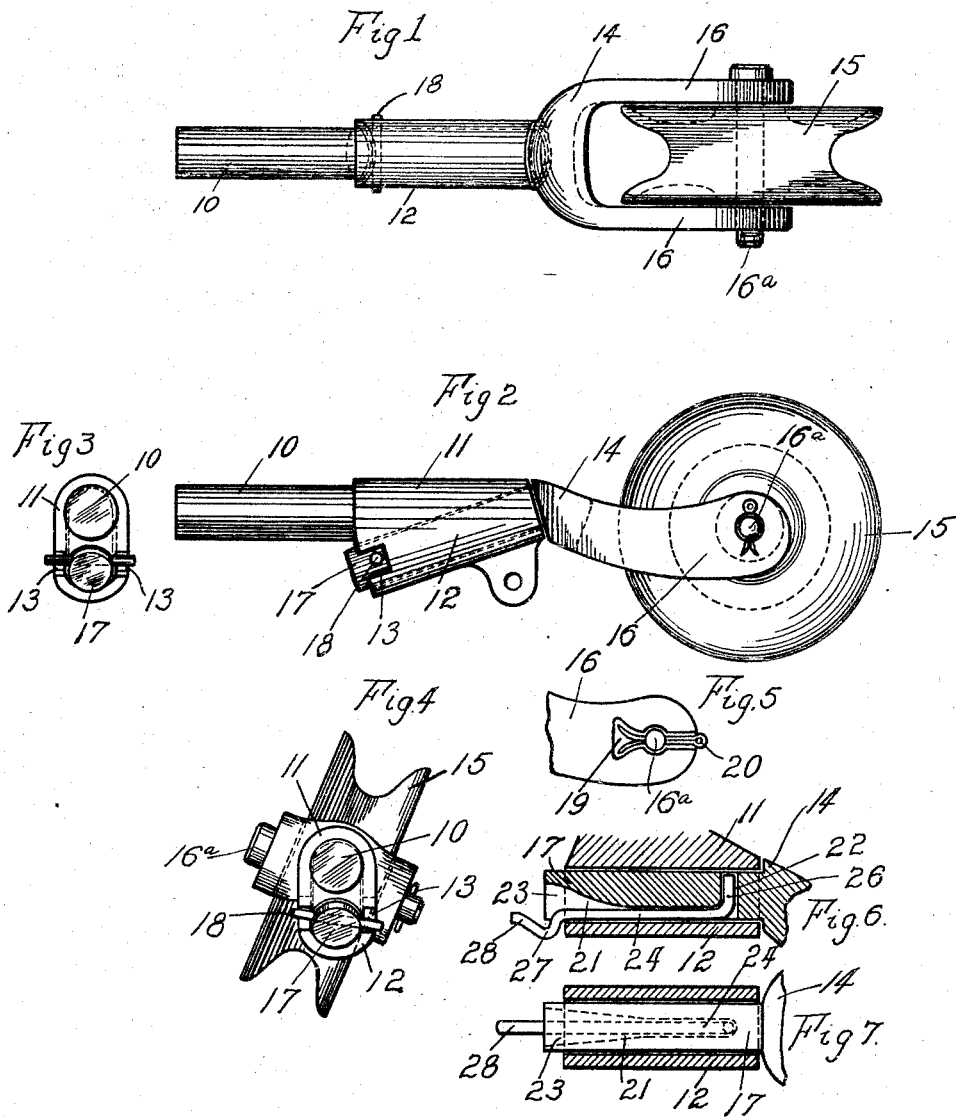

UNITED STATES PATENT OFFICE.

GILBERT L. ADAMS, OF ALTOONA, PENNSYLVANIA.

TROLLEY-HARP MOUNTING.

No. 928,016.　　　　Specification of Letters Patent.　　　Patented July 13, 1909.

Application filed November 21, 1908.　Serial No. 463,876.

*To all whom it may concern:*

Be it known that I, GILBERT L. ADAMS, a citizen of the United States, residing at Altoona, in the county of Blair and State of Pennsylvania, have invented certain new and useful Improvements in Trolley-Harp Mountings, of which the following is a specification.

This invention relates to the subject of trolley poles, and more particularly to an improved mounting for the harp or head of the trolley.

To this end the invention has in view a novel and practical mounting for a trolley harp readily adapted to the ordinary trolley pole, while at the same time providing an equipment which permits the entire trolley equipment to lie flat on top of the car. Also, the improved construction provides a trolley harp mounting which enables the trolley wheel to readily and freely adapt itself to the wire on curves and cross-over switches with a minimum amount of wear on both the wheel and the wire. Also, the invention contemplates a structure of this kind which shall be simple, inexpensive, and easily made.

In carrying out the objects of the invention generally stated above it will be obvious that changes in details and structural arrangements may be resorted to, but a preferred and practical embodiment of the same is shown in the accompanying drawings, wherein—

Figure 1 is a bottom plan view of a portion of a trolley pole showing the improved head applied thereto. Fig. 2 is a side elevation. Fig. 3 is a projected end elevation of the same, the trolley wheel being omitted. Fig. 4 is an end elevation showing the trolley wheel turned at an angle relative to its swivel connection with the head or harp. Fig. 5 is a detail view of one end of one of the arms 16 showing the same provided with a key seat. Fig. 6 is a longitudinal view of a modified form of journal stem and connecting pin. Fig. 7 is a similar view taken at right angles to Fig. 6.

Like characters of reference designate corresponding parts.

Referring to the accompanying drawings, 10 designates the trolley pole to which is fitted a sleeve 11 provided with an obliquely arranged longitudinally extending socket 12 the inner end of which has formed therein oppositely arranged notches 13.

The trolley harp 14 has the usual trolley wheel 15 rotatively mounted between its side arms 16 on the axle 16ª, and at its other end portion said harp is provided with an angularly or obliquely disposed journal stem 17 which has a pin or key 18 passed through its end portion and projecting from opposite sides thereof. The ends of said pin are adapted to enter the notches 13 formed in the end portion of the socket 12, thereby, in addition to serving the function of retaining said journal stem in the socket 12, also permits of the same having a rotary movement therein which is limited by the contact of the pin 18 with the shoulders of the notches 13, as is clearly shown in Fig. 4.

From the foregoing it will be understood that the present invention is one that may be readily used in connection with the type of trolley harp now in general use, the only addition thereto being required is the forming of the offset socket with the holding notches and the bending of the harp journal.

The invention is specially adapted for use in connection with trolleys wherein there are a number of turns and switches, as it will be readily understood that through the swivel connection between the harp and said head, various movements of the harp relative to said head may be had to compensate for any sharp or irregular curves or turns of the trolley.

Another important feature of the invention is that through the described mounting of the head and harp, the trolley wheel may be swung to one side to permit of the pole being laid flat on the top of the car when not in use.

In Fig. 5 of the accompanying drawings one of the wheel arms is shown provided with a recess 19 forming a seat for the axle key 20. Said seat is preferably of the same general shape as the key and is of sufficient depth to prevent the key projecting beyond the side plane of the arm.

In Figs. 6 and 7 the journal stem 17 is shown provided with a longitudinal side slot 21 the inner end of which terminates in a transverse opening 22 that extends through said stem. The outer portion of said slot terminates in a flaring and deepened entrance 23 to provide clearance for a locking spring pin 24. Said spring pin 24 has one end bent at right angles thereto to form a locking finger 26 for engagement with the transverse opening 22, its other end being crimped or bent to form an abutment shoulder 27 that engages over one end edge of the socket 12, and a finger 28 for releasing said shoulder from engagement with the edge of the socket.

It will be observed that the modification shown in Figs. 6 and 7 of the drawings discloses a construction which is of special utility where curves are numerous on a trolley line. The spring 24 and the manner in which the same is associated with the stem 17, provide means for assisting the trolley wheel to immediately come in line under the wire as soon as the curve is rounded, inasmuch as the outer end of said spring will frictionally engage and maintain its position against the wall of the socket 12, while it will be transversely bent upon the turning of the stem. It will thus react when the wheel is relieved of lateral pressure. The lateral flare of the deepened part 23 of the slot or groove 21 provides means for facilitating the mounting of the spring in position, while at the same time admitting of lateral play or movement for the spring when the trolley wheel strikes a curve. It will be observed that with this construction, the outer end of the socket is disposed in line with the pole and the stem 17 is offset so that the harp will be disposed in line with the pole. There is thus no upwardly moving portion of any kind beyond the front face of the pole and head.

Claims:—

1. The combination with a trolley pole having a head, said head having an obliquely disposed socket, the outer end of which is arranged in line with the pole, a harp disposed in substantial line with the pole and having an offset stem journaled in the socket, means for retaining the stem in the socket, while permitting a limited rotary movement thereof, and a wheel journaled in the harp and having its axis in line with the pole.

2. The combination with a trolley pole having a head, said head having an obliquely disposed socket, the outer end of which is disposed in line with the pole, the inner end of the head having notches arranged on opposite sides of the socket, a harp disposed in line with the pole and having an offset stem journaled in the socket and projecting beyond the notches, a cross pin detachably located in the inner end of the stem and having its ends engaged in the notches, said ends having limited play therein, and a wheel journaled on the harp.

In testimony whereof I hereunto affix my signature in the presence of two witnesses.

GILBERT L. ADAMS.

Witnesses:
N. E. GEE,
CALVIN STOUCH.